United States Patent [19]
Duvall

[11] Patent Number: 5,435,333
[45] Date of Patent: Jul. 25, 1995

[54] THERMALLY RESPONSIVE PRESSURE RELIEF APPARATUS

[75] Inventor: Paul F. Duvall, Lincolnshire, Ill.

[73] Assignee: Brunswick Corporation, Lake Forest, Ill.

[21] Appl. No.: 258,516

[22] Filed: Jun. 10, 1994

[51] Int. Cl.⁶ .................. F16K 17/16; F16K 17/40
[52] U.S. Cl. ........................... 137/73; 137/74; 137/68.12; 137/68.25; 220/89.2; 220/89.4
[58] Field of Search .............. 137/68.1, 72, 73, 74; 220/89.1, 89.2, 89.4

[56] References Cited

U.S. PATENT DOCUMENTS

| | | | |
|---|---|---|---|
| 1,692,773 | 11/1928 | Friedman | 137/73 X |
| 1,960,272 | 5/1934 | Lovekin | 137/73 |
| 2,166,277 | 7/1939 | Adams | 137/74 X |
| 2,357,620 | 9/1944 | Thomas | 137/73 X |
| 2,742,179 | 4/1956 | Livers | 220/89.4 |
| 3,109,555 | 11/1963 | Samans | 220/89.4 |
| 3,384,101 | 5/1968 | Melzer | 137/73 |
| 4,046,157 | 9/1977 | Cazalaa et al. | 137/74 |
| 4,064,890 | 12/1977 | Collins et al. | 137/73 |
| 4,221,231 | 9/1980 | Harvey et al. | 137/72 |
| 4,313,453 | 2/1982 | Holmes | 137/74 |
| 4,352,365 | 10/1982 | Boccardo et al. | 137/68.1 |
| 4,505,180 | 3/1985 | Hinrichs | 137/68.1 X |
| 4,706,698 | 11/1987 | Short, III | 137/68.1 |
| 4,744,382 | 5/1988 | Visnic et al. | 137/68.1 |
| 4,750,510 | 6/1988 | Short, III | 137/68.1 |
| 5,213,128 | 5/1993 | Baird | 137/73 |

FOREIGN PATENT DOCUMENTS 625083 9/1978 U.S.S.R. .

Primary Examiner—John Rivell
Attorney, Agent, or Firm—John R. Hoffman

[57] ABSTRACT

A thermally responsive pressure relief system is provided for a receptacle such as a pressure vessel. A passage communicates the interior of the vessel with the exterior thereof. A closure member is positioned in the passage. A fusible bonding material of a selected melting point fixes the closure member in the passage. The closure member includes an integral rupturable section that ruptures at a selected pressure differential between the interior and the exterior of the vessel.

16 Claims, 3 Drawing Sheets

THERMALLY RESPONSIVE PRESSURE RELIEF APPARATUS

FIELD OF THE INVENTION

This invention generally relates to the art of safety devices for receptacles such as pressure vessels, and such vessels as those in which compressed gases are stored.

BACKGROUND OF THE INVENTION

A wide variety of fluid pressure relief apparatus have been developed and used heretofore. Such apparatus may include a rupturable member supported so that when the internal pressure of the vessel contents gets too high or exceeds a predetermined level, rupture occurs and fluid pressure is relieved. On the other hand, quite apart from internal pressure, rupture can occur through destruction of the vessel due to increasing temperature of the material of which the vessel is made.

It can be appreciated that a safety relief valve that opens at a certain pressure value gives some protection against overheating of the vessel itself. However, under certain conditions, such as a partially filled vessel or one made of a material which undergoes a relatively rapid deterioration of its tensile strength or other physical property with increasing temperature, a pressure responsive apparatus may not be sufficient to relieve the pressure before the stresses induced in the vessel exceed the predetermined level. Because of this, it is advantageous to employ a relief apparatus which has both temperature and pressure sensing mechanisms which are independent of each other.

Regarding the material of which the vessel is made, thick walled metal pressure vessels typically have a reasonably long endurance when subjected to high temperatures, such as being engulfed by flames due to a fire, and thus are often protected from catastrophic failure by a pressure type apparatus that ruptures at 25–50% above normal pressure. On the other hand, filament composite pressure vessels typically have much shorter endurance times, and generally the vessel contents do not incur a substantial pressure rise before the structure deteriorates sufficiently to cause a catastrophic failure. Thus, filament composite pressure vessels often are protected from catastrophic failure mostly by a thermally activated relief apparatus. Yet, the contents of the vessel still may require a rupturable-type pressure safety mechanism.

Heretofore, combination temperature responsive pressure relief apparatus have been fairly complicated and expensive to manufacture. This is because of the multiple components used in the apparatus. For instance, U.S. Pat. Nos. 4,352,365, to Boccardo et al, dated Oct. 5, 1982; 4,744,382, to Visnic et al, dated May 17, 1988; and 4,750,510, to Short, dated Jun. 14, 1988, are but some examples of combination temperature responsive pressure relief apparatus of the multiple-component type. In other words, each of these patents show one form or another of a plug or other component that is held in place or otherwise operatively associated with a fusible member or material. This provides the temperature responsive means for the apparatus. In addition, a completely separate pressure responsive member, such as a rupturable diaphragm, also is used to provide the pressure responsive portion of the combined apparatus. Sometimes, additional components must be required to hold the rupturable diaphragm in position. In other types of apparatus, separate components must be used to hold a fusible component in position. It readily can be seen how these multi-component apparatus can be relatively expensive.

The present invention is directed to a solution to these problems of complexity and cost by providing a very simple combination temperature responsive and pressure responsive apparatus wherein a single element is held in place within a pressure passage by a fusible bonding material and the element, itself, is designed to be pressure-rupturable.

SUMMARY OF THE INVENTION

An object, therefore, of the invention is to provide a new and improved thermally responsive pressure relief system for a receptacle such as a pressure vessel.

In the exemplary embodiment of the invention, a passage is provided communicating the interior of the vessel with the exterior thereof. A closure member is positioned in the passage. A fusible bonding material of a selected melting point fixes the closure member in the passage. The closure member includes an integral rupturable section that ruptures at a selected pressure differential between the interior and the exterior of the vessel.

As disclosed herein, the closure member has an overall given wall thickness, and the rupturable section comprises a reduced thickness thereof. The closure member includes a dome-shaped portion, and, in one embodiment of the invention, the dome-shaped portion is flattened at a given location in the passage to provide the rupturable section of reduced thickness. The closure member may be of metal material, and the flattened section simply can be ground or machined to provide the reduced thickness.

In another embodiment of the invention, the dome-shaped portion is provided with a groove or slot to provide the rupturable reduced thickness of the closure member.

In a pressure vessel fabricated of filament composite material, a body member may be mounted in an opening in the pressure vessel, with the passage being located in the body member. The closure member is provided as a generally hollow plug member positioned in the passage in the body member for movement between a first position fixed by the fusible bonding material and a second position in response to internal pressure of the vessel when the bonding material melts. Vent passage means are provided through the closure member and in the body member, the vent passage means being closed when the closure member is in its first position and open when the closure member is in its second position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
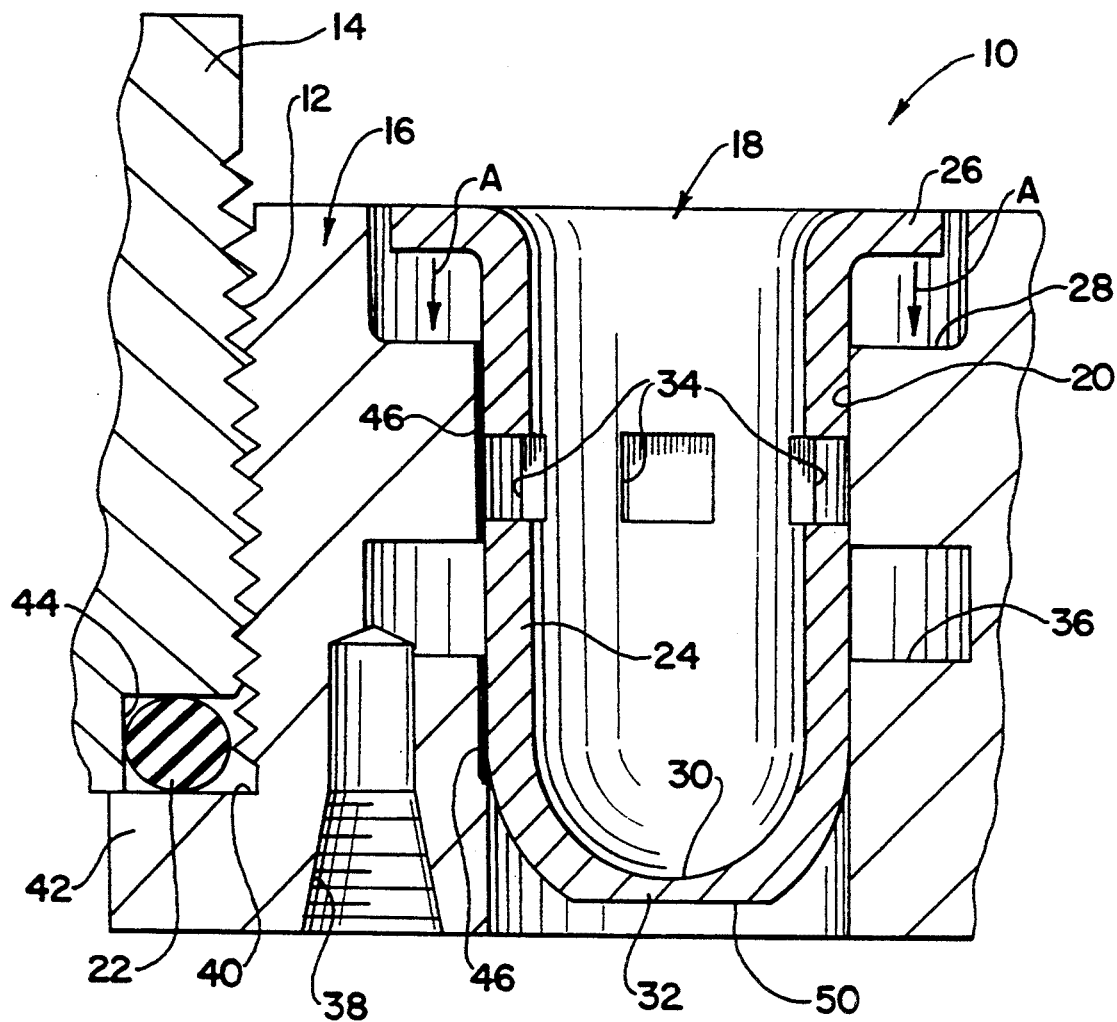
FIG. 1 is a section through the thermally responsive pressure relief system or apparatus of the invention in its normally closed position.

Referring to the drawings in greater detail, a first embodiment of a thermally responsive pressure relief system or apparatus, generally designated 10, is shown mounted within an opening 12 in a receptacle such as a pressure vessel 14. Generally, the pressure relief apparatus includes only two components, namely a body member, generally designated 16 mounted within opening 12 of vessel 14, and a closure member or plug, generally designated 18, mounted within a passage 20 within body member 16.

At this point, it should be understood that thermally responsive pressure relief apparatus 10 is shown herein as a two-component system (i.e. body 16 and plug 18), because the invention is quite applicable for use in a pressure vessel 14 fabricated of filament composite material. With such a pressure vessel, it might be advantageous to use body member 16 threaded into opening 12 in the composite wall of the vessel, as shown, and to add a sealing means 22. However, it should be understood that the invention contemplates mounting plug member 18 directly into passage 20 wherein the passage, itself, is the opening in the pressure vessel, thereby obviating the necessity of a separate body member.

With the above understanding, plug member 18 is shown to be generally hollow or cylindrical as defined by outside walls 24 of a given thickness. The upper end (as viewed in the drawings) of plug member 18 includes an outwardly projecting radial flange 26 for abutting against a shoulder 28 of body 16, as described hereinafter. The lower end of the plug is dome-shaped, as at 30, and includes a rupturable section 32 of a reduced wall thickness, as described hereinafter. Lastly, the plug includes a plurality of holes 34 through outside walls 24, again for purposes described hereinafter.

As stated above, body 16 is threadably mounted within opening 12 in vessel 14, as shown. Shoulder 28 surrounds passage 20 in the body for abutment by flange 26 of the plug. An annular groove 36 is formed in the body surrounding passage 20 and plug 18. The groove communicates with an outlet 38 to atmosphere. Seal 22 can be a ring seal disposed between a shoulder 40 formed by a flange 42 of the body and an annular recess 44 in vessel 14.

The invention contemplates closure member or plug 18 to be fixed within passage 28 in the position shown in FIG. 1 by a thermally sensitive, fusible bonding material 46 between outside wall 24 of the plug and the inside of passage 20. The fusible bonding material preferably is a low melting point eutectic alloy with sufficient shear strength at 200° F. to withstand a design minimum pressure load (e.g. 7,000–10,000 psig) of pressure vessel 14. The eutectic alloy would be chosen to melt or flow at a temperature in the range of 225°–275° F.

Figure 2:
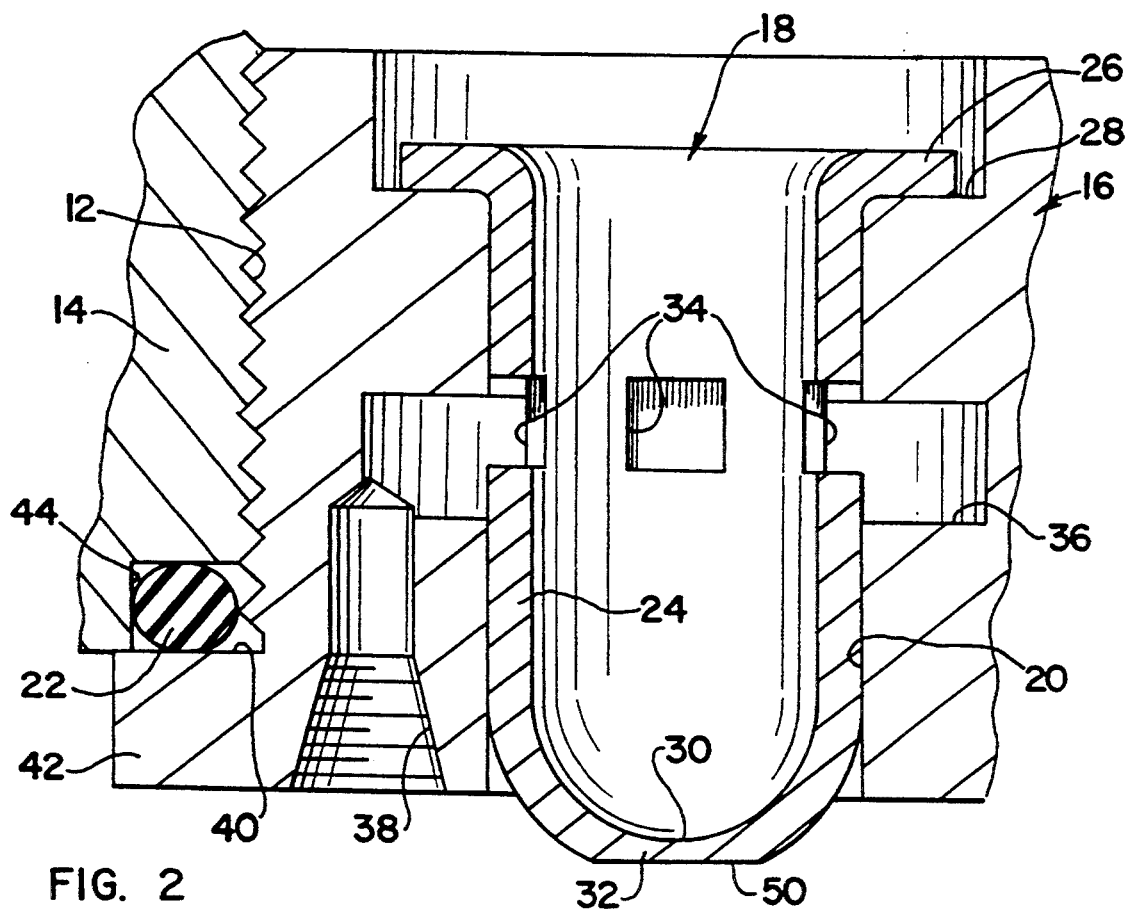
FIG. 2 is a view similar to that of FIG. 1, with the closure member moved to an open position in response to melting of the fusible bonding material.

When fusible bonding material 26 melts, the pressure within vessel 14 causes plug 18 to move in the direction of arrows "A" (FIG. 1) to the position shown in FIG. 2. This can be considered the pressure relief position. In this position, flange 26 of plug 18 engages and abuts against shoulder 28 of body 16. In addition, holes 34 in the plug now are aligned with angular groove 36 in the body. Therefore, pressure is relieved from within vessel 14 through holes 34, groove 36 and outlet 38 to atmosphere.

Figure 3:
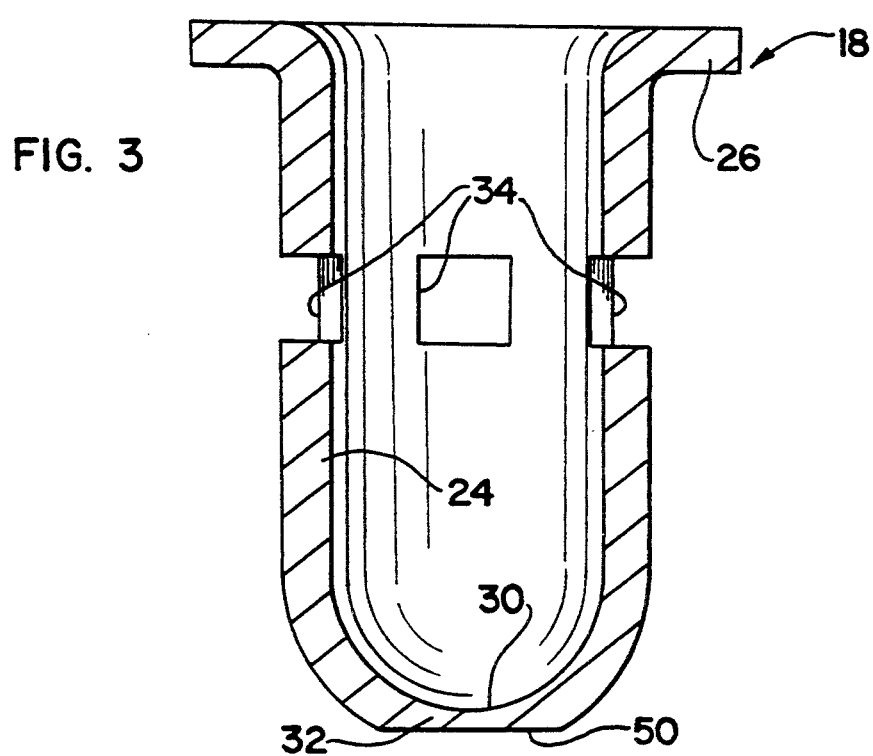
FIG. 3 is an isolated section of the closure member, alone, with one embodiment of an integral rupturable reduced thickness.

Referring to FIG. 3 in conjunction with FIGS. 1 and 2, as stated above, a reduced thickness 32 in the wall means 24 of plug 18 is formed at the bottom dome-shaped portion of the plug. The reduced thickness 32 is clearly seen in FIGS. 1–3. The reduced thickness is provided simply by flattening the outside of dome-shaped portion 30, as at 50. For instance, plug 18 may be readily fabricated of sheet metal material in a drawing process. The outside of the dome-shaped portion of the plug then simply can be flattened at 50 by a grinding or machining process. Holes 34 simply can be punched into the metal material. It can be seen that the fabrication of plug 18 is very simple.

Figure 4:
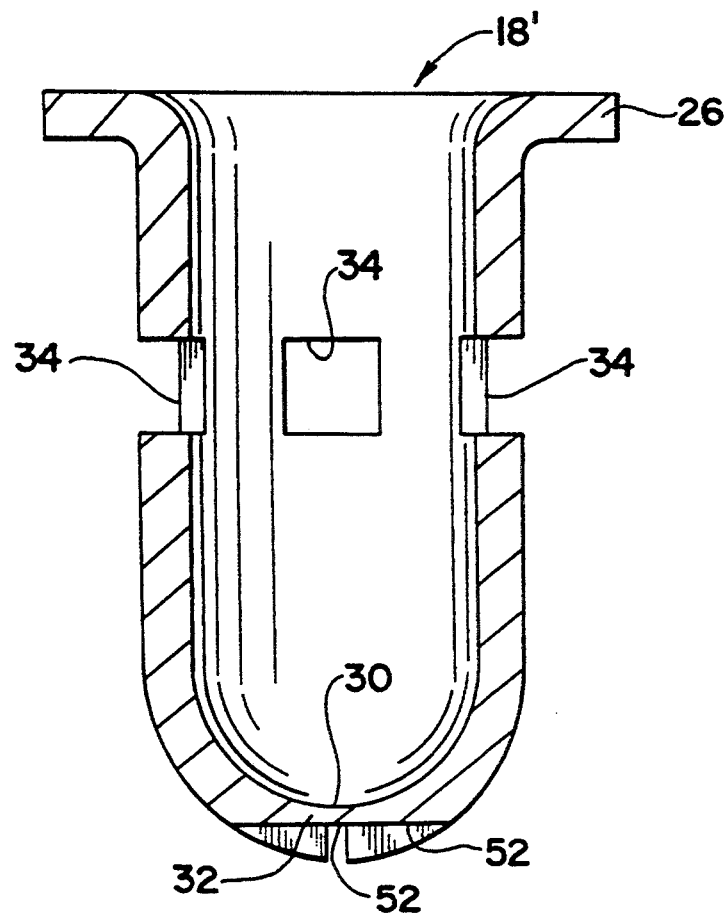
FIG. 4 is a view similar to that of FIG. 3, with the closure member including a second embodiment of an integral rupturable reduced thickness.
Figure 5:
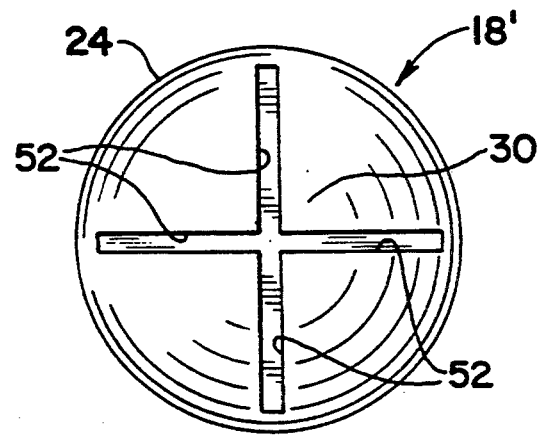
FIG. 5 is a bottom plan view of the closure member in FIG. 4.

FIGS. 4 and 5 show an alternate embodiment of a closure member or plug, generally designated 18', and like numerals are applied in FIGS. 4 and 5 corresponding to like elements described above in relation to FIGS. 1–3. In the embodiment of FIGS. 4 and 5, reduced thickness 32 in wall means 24 of plug 18 is formed inside of grooves 52 formed in the outside of the dome-shaped portion of the plug. FIG. 5 shows that the grooves are in a generally cross-shaped configuration. Again, like the grinding or machining of flattened area 50 in the embodiment of FIGS. 1–3, grooves 52 are very simply formed by a machining operation. On the other hand, if plugs 18 and/or 18' are fabricated of a cast or molded material, flattened area 50 and grooves 52 can be integrally formed in the plug with equal simplicity.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A thermally responsive pressure relief system for a receptacle such as a pressure vessel, with a passage communicating the interior of the vessel with the exterior thereof, comprising:
   a closure member positioned in said passage;
   a fusible bonding material of a selected melting point disposed directly between the closure member and the passage affixing the closure member in the passage; and
   the closure member including an integral rupturable section that ruptures at a selected pressure differential between the interior and the exterior of the vessel.

2. The thermally responsive pressure relief system of claim 1 wherein said closure member has an overall given thickness, and said rupturable section of the closure member comprises a reduced thickness thereof.

3. The thermally responsive pressure relief system of claim 2 wherein a groove is formed in the closure member to provide said reduced thickness.

4. The thermally responsive pressure relief system of claim 1 wherein said closure member is mounted in the passage for movement between a first position fixed by said fusible bonding material and a second position in response to internal pressure of the vessel when the bonding material melts.

5. The thermally responsive pressure relief system of claim 4, including vent passage means through the closure member, the vent passage means being closed when the closure member is in said first position and open when the closure member is in said second position.

6. A thermally responsive pressure relief system for a receptacle such as a pressure vessel, with a passage communicating the interior of the vessel with the exterior thereof, comprising:
   a closure member positioned in said passage;
   a fusible bonding material of a selected melting point affixing the closure member in the passage; and
   the closure member including an integral rupturable section that ruptures at a selected pressure differential between the interior and the exterior of the vessel, said closure member having an overall given thickness with said rupturable section comprising a reduced thickness thereof, and said closure member including a dome-shaped portion that is flattened at a given location in the passage to provide said reduced thickness.

7. The thermally responsive pressure relief system of claim 6 wherein said closure member comprises a metal member having the outside of the dome-shaped portion thereof ground away to provide said reduced thickness.

8. A thermally responsive pressure relief system for a receptacle such as a pressure vessel which has an opening therein, comprising:
   a body member mounted in said opening and including a through passage communicating the interior of the vessel with the exterior thereof;
   a generally hollow plug member positioned in the passage and including outside wall means of a given thickness about an inside cavity communicating with the vessel;
   a fusible bonding material of a selected melting point affixing the plug member to the body member; and
   the wall means of the plug member including a rupturable section of a reduced thickness that ruptures at a selected pressure differential between the interior and the exterior of the vessel.

9. The thermally responsive pressure relief system of claim 8 wherein said plug member includes a dome-shaped portion that is flattened at a given location in the passage to provide said reduced thickness.

10. The thermally responsive pressure relief system of claim 9 wherein said plug member comprises a metal member having the outside of the dome-shaped portion thereof ground away to provide said reduced thickness.

11. The thermally responsive pressure relief system of claim 8 wherein a groove is formed in the plug member to provide said reduced thickness.

12. The thermally responsive pressure relief system of claim 11 wherein said plug member includes a dome-shaped portion in the passage, with said groove being located in the dome-shaped portion.

13. The thermally responsive pressure relief system of claim 8 wherein said plug member is mounted in the passage for movement between a first position fixed by said fusible bonding material and a second position in response to internal pressure of the vessel when the bonding material melts.

14. The thermally responsive pressure relief system of claim 13, including vent passage means through the plug member, the vent passage means being closed when the plug member is in said first position and open when the plug member is in said second position.

15. A thermally responsive pressure relief system for a receptacle such as a pressure vessel, with a passage communicating the interior of the vessel with the exterior thereof, comprising:
   a closure member positioned in said passage;
   a fusible bonding material of a selected melting point affixing the closure member in the passage; and
   the closure member including an integral rupturable section that ruptures at a selected pressure differential between the interior and the exterior of the vessel, said closure member having an overall given thickness and including a dome-shaped portion in the passage, said rupturable section of the closure member comprising a reduced thickness thereof formed by a groove located in the dome-shaped portion.

16. A thermally responsive pressure relief system for a receptacle such as a pressure vessel, with a passage communicating the interior of the vessel with the exterior thereof, comprising:
   a body member mounted in an opening said vessel, said passage being located in the body member;
   a closure member positioned in said passage;
   a fusible bonding material of a selected melting point affixing the closure member in the passage; and
   the closure member including an integral rupturable section that ruptures at a selected pressure differential between the interior and the exterior of the vessel.

* * * * *